United States Patent [19]
Kawaguchi et al.

[11] Patent Number: 5,828,192
[45] Date of Patent: Oct. 27, 1998

[54] ELECTRIC VEHICLE POWER FEED SYSTEM

[75] Inventors: Kenji Kawaguchi, Tokyo; Masayuki Toriyama, Saitama, both of Japan

[73] Assignee: Honda Giken Kogyo Kabushiki Kaisha, Tokyo, Japan

[21] Appl. No.: 683,423

[22] Filed: Jul. 18, 1996

Related U.S. Application Data

[63] Continuation of Ser. No. 190,538, Feb. 2, 1994, abandoned.

[30] Foreign Application Priority Data

Feb. 2, 1993 [JP] Japan .................................. 5-037443

[51] Int. Cl.$^6$ ...................................... H02P 1/00
[52] U.S. Cl. ........................ 318/139; 318/254; 318/439; 318/434; 318/801
[58] Field of Search .......................... 318/798–811, 434, 318/139, 254, 439; 388/809–815, 902, 903

[56] References Cited

U.S. PATENT DOCUMENTS

| | | | |
|---|---|---|---|
| 4,172,233 | 10/1979 | Joyes | 318/139 |
| 4,207,602 | 6/1980 | Kussy et al. | 318/473 X |
| 4,388,573 | 6/1983 | Horiuchi et al. | 318/139 |
| 4,422,120 | 12/1983 | Kobayashi et al. | 318/783 X |
| 4,667,264 | 5/1987 | Yamazaki et al. | |
| 4,787,021 | 11/1988 | Hokari et al. | |
| 5,107,191 | 4/1992 | Lowndes et al. | 318/139 |
| 5,157,293 | 10/1992 | Escaravage | 310/71 |
| 5,206,575 | 4/1993 | Nakamura et al. | 318/807 |
| 5,276,282 | 1/1994 | Goto et al. | 318/759 |
| 5,291,106 | 3/1994 | Murty et al. | 318/375 |
| 5,412,293 | 5/1995 | Minezawa et al. | 318/376 |

FOREIGN PATENT DOCUMENTS

| | | |
|---|---|---|
| 0477054 | 3/1992 | European Pat. Off. . |
| 5095606 | 4/1993 | Japan . |
| WO9301650 | 7/1991 | WIPO . |

Primary Examiner—David S. Martin

[57] ABSTRACT

A power feed system for feeding power to an electric vehicle includes a motor driving circuit provided with a smoothing capacitor. The motor driving circuit is capable of preventing the smoothing capacitor from being discharged and has a comparatively short main current supply line to reduce unnecessary power loss. The motor driving circuit converts dc supply power into ac supply power to feed the ac supply power to a motor. The motor driving circuit includes the smoothing capacitor and a plurality of semiconductor switching devices, which are built in the motor. An electromagnetic relay is placed within a case housing the motor driving circuit and the electromagnetic relay is controlled to supply a main current to the motor driving circuit and to interrupt the supply of the main current to the motor driving circuit.

23 Claims, 7 Drawing Sheets

ELECTRIC VEHICLE POWER FEED SYSTEM

This application is a continuation of application Ser. No. 08/190,538 filed on Feb. 2, 1994, now abandoned.

BACKGROUND OF THE INVENTION

1. Field of the Invention

The present invention relates to a power feed system for feeding power to the motor of an electric vehicle, such as an electric motorcycle.

2. Description of the Background Art

Applicants have previously proposed in Japanese Patent Application No. 3-293693 (Japanese Patent Publication 5-95606) a power unit for an electric vehicle having a motor driving circuit integrally built in a dc brushless motor to simplify the wiring of the power feed system and to enable construction of a power feed system of small size.

FIG. 7 is a circuit diagram of a known power feed system for feeding power to a motor. The known power feed system 101 has a motor driving circuit 103 built in a motor 102 and a power relay unit 105 interconnecting the motor driving circuit 103 and a battery unit 104 for feeding power to the motor 102. The power relay unit 105 is provided with a power relay 106 having a first switch 106a which is opened to interrupt the supply of dc power to the motor driving circuit 103. When the first switch 106a is opened to stop feeding dc power to the motor driving circuit 103, a second switch 106b is closed to discharge a smoothing capacitor 103a included in the motor driving circuit 103 through a first set of contacts of the second switch 106b and a discharging resistor 107 in order to ensure that a person who has accidentally touched an output terminal 103b or an input terminal 105a will not be shocked by electricity.

Since the motor driving circuit 103 and the battery unit 104 are interconnected by the power relay unit 105, the second switch 106b of the power feed system 101 is needed for discharging the smoothing capacitor 103a of the motor driving circuit 103 in addition to the first switch 106a for connecting the battery unit 104 to the motor driving circuit 103. This required circuitry makes it difficult to miniaturize the power relay unit 105.

Moreover, once the first switch 106a of the power relay 106 is closed to charge the smoothing capacitor 103a through the first set of contacts when the smoothing capacitor 103a is completely discharged, a large charging current flows through the first switch 106a to charge the smoothing capacitor 103a. There is the possibility that such a large charging current may damage the first switch 106a. Accordingly, when a combination switch 108 is closed, a limited charging current is supplied through a charging resistor 109 and a reverse-current diode 110 to the smoothing capacitor 103a and, at the same time, a current is supplied through the charging resistor 109 to the coil 106c of the power relay 106 so that the voltage across the coil 106c increases as the smoothing capacitor 103a is charged. Thus, the first switch 106a of the power relay 106 is closed once the voltage across the coil 106c of the power relay 106 reaches the operating voltage of the power relay 106 in order to protect the first switch 106a by reducing rush current when the first switch 106a is closed.

However, when power is fed through a second set of contacts of the second switch 106b to a stabilized power supply 111 and the output of the stabilized power supply 111 is supplied to a control circuit and other circuits, the stabilized power supply 111 is unable to provide a desired output because the current that flows to the stabilized power supply 111 is limited by the charging resistor 109 if the second switch 106b is switched to connect the second set of contacts before the first contact 106a through which the main current flows is closed.

Therefore, the switches must be closed sequentially according to a predetermined sequence and the contact mechanisms must have high dimensional accuracy, increasing the expense of power relay 106.

Since the power relay unit 105 of the power feed system 101 is comparatively large, it is difficult to dispose the power relay unit 105 near the motor driving circuit 103 or the battery unit 104. The power relay unit 105 is disposed in a control box or the like containing the combination switch and the associated components. Therefore, a comparatively long cable for supplying a main current to the motor 102 is necessary to connect the power relay unit 105 to the motor driving circuit 103, which entails unnecessary power loss.

SUMMARY OF THE INVENTION

The present invention has been made to solve the foregoing problems and it is, therefore, an object of the present invention to provide a power feed system for feeding power to a motor, the power feed system having a smoothing capacitor which need not be discharged and a comparatively short main current supply line to reduce unnecessary power loss.

To solve the foregoing problems, the present invention provides a power feed system for feeding power to the motor of an electric vehicle, the power feed system having a motor driving circuit for converting dc supply power into ac power and feeding the ac power to the motor, the motor driving circuit including a smoothing capacitor and a plurality of semiconductor switching devices and being built in the motor; and an electromagnetic relay disposed within a case or housing containing the motor driving circuit to make and break a circuit for supplying the dc supply power to the motor driving circuit.

The electromagnetic relay may be disposed within and near the lower end of the case containing the motor driving circuit and the case may be provided at its lower end with an opening.

Since the electromagnetic relay is disposed within the case containing the motor driving circuit, the main current supply line may be comparatively short, so that unnecessary power loss is reduced.

Since the circuit for supplying the dc supply power to the motor driving circuit is enabled and disabled by the electromagnetic relay, the smoothing capacitor is disconnected perfectly from the power feed side and, consequently, the smoothing capacitor is not discharged.

Since the electromagnetic relay is disposed within and near the lower end of the case containing the motor driving circuit, and the case is provided with an opening at its lower end, the space around the electromagnetic relay can be ventilated and the case can be drained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A preferred embodiment of the present invention will be described hereinafter with reference to the accompanying drawings.

Figure 1:
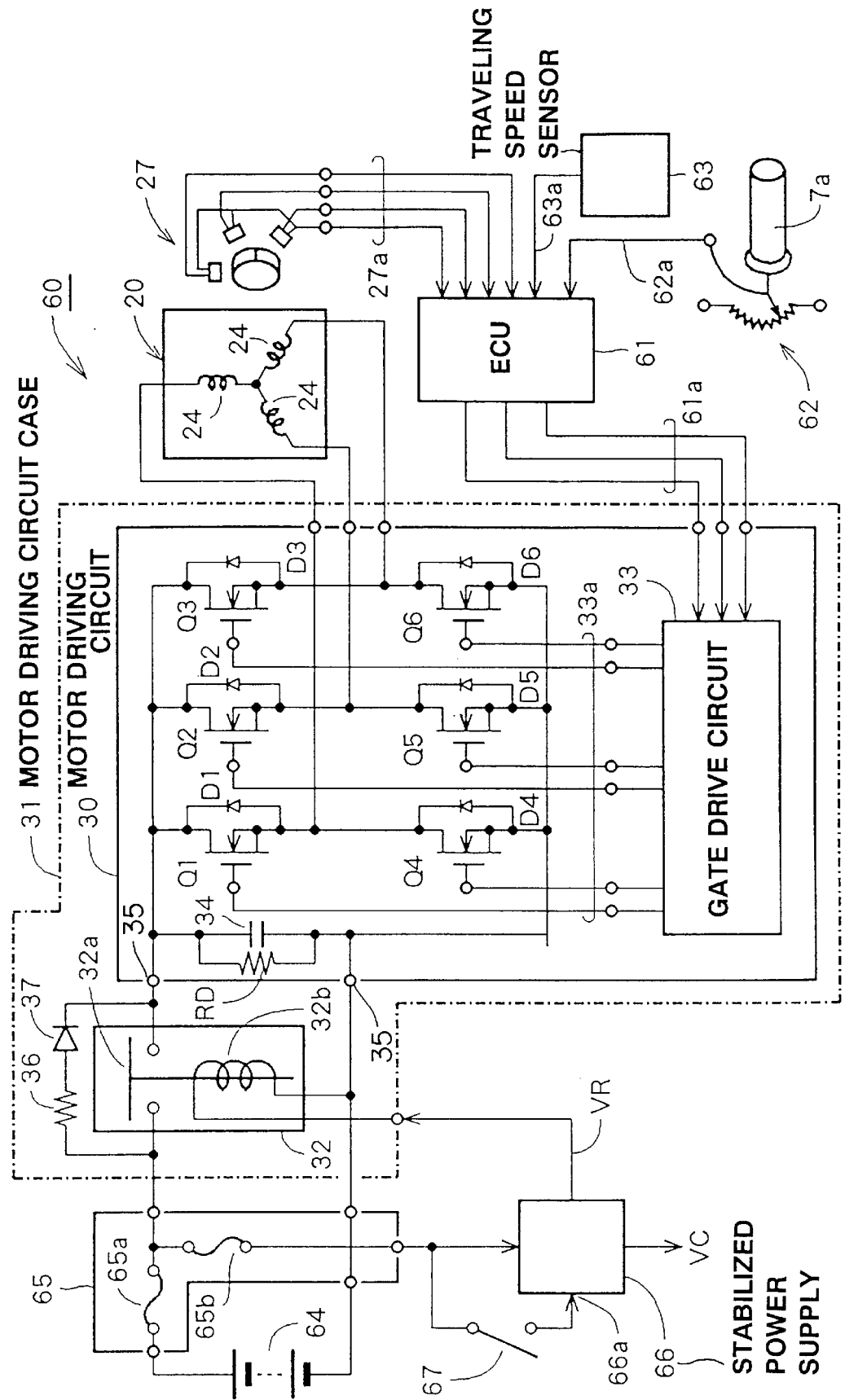
FIG. 1 is a circuit diagram of a power feed system, for feeding power to an electric vehicle, of a preferred embodiment of the present invention.
Figure 2:
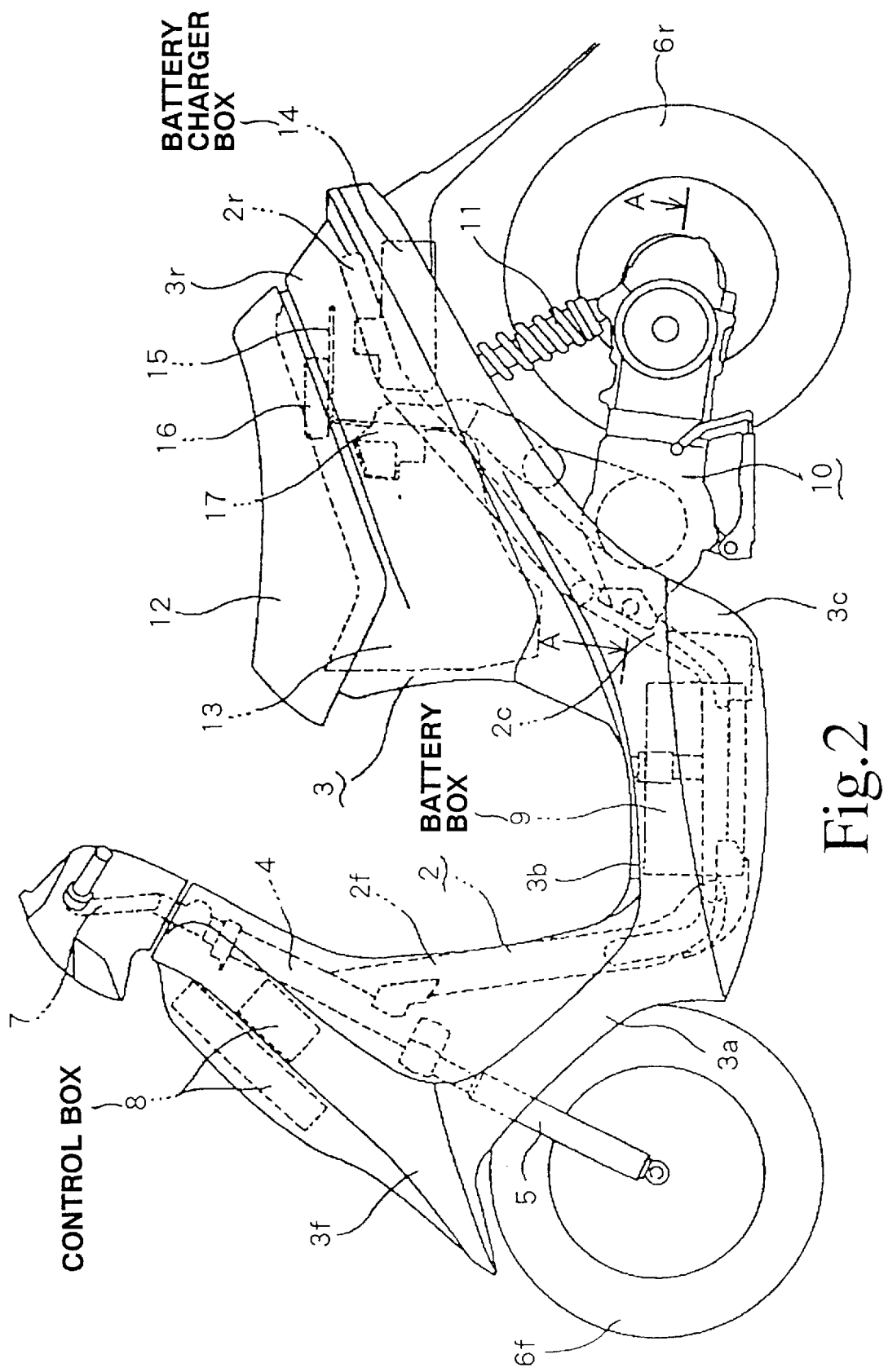
FIG. 2 is a side view of an electric motorcycle provided with the power feed system of FIG. 1.

FIG. 1 is a circuit diagram of a power feed system for feeding power to the motor of an electric vehicle according to a preferred embodiment of the present invention and FIG. 2 is a side view of an electric motorcycle provided with the power feed system of FIG. 1.

Referring to FIG. 2, an electric motorcycle 1 has a substantially U-shaped frame 2 consisting of a front frame 2f, a center frame 2c and a rear frame 2r. The frame 2 is covered with a body 3 formed of a synthetic resin and consisting of a front cover 3f, a leg shield 3a, a step floor 3b, a rear cover 3r and an under cover 3c. A head tube 4 is fixed to the front end of the front frame 2f and a front fork 5 supporting a front wheel 6f is supported for turning on the head tube 4. A steering bar 7 is attached to the upper end of the front fork 5.

A control box 8 is attached to the head tube 4 and a controller comprising an Electronic Control Unit and the like is contained in the control box 3. A battery box 9 containing a plurality of batteries is supported on the center frame 2f. An electric power unit 10 is joined pivotally to the rear portion of the center frame 2f with a pivot shaft, which is not shown. The electric power unit 10 supports a rear wheel 6r for rotation. A cushioning unit 11 has one end joined to the frame 2 and the other end joined to the rear end of the electric power unit 10.

The rear cover 3r is fixed to the rear frame 2r. The rear cover 3r is a substantially tubular structure having an upper opening. A seat 12 is supported on the rear cover 3r so as to cover the upper opening of the rear cover 3r. The seat 12 is disposed on the rear cover 3r and joined at its front end to the rear cover 3r by a hinge or the like. The seat 12 is placed on the rear cover 3r so as to cover the upper opening of the rear cover 3r when the driver sits thereon. The seat 12 can be turned on the hinge to provide access through the upper opening of the rear cover 3r. A trunk box 13 and a battery charger box 14 are disposed one behind the other, in the rear cover 3r, obliquely above the rear wheel 6r. The trunk box 13 has an upper opening covered with the seat 12. The trunk box 13 is large enough to contain a crash helmet.

The battery charger box 14 has a shape substantially resembling the letter L as viewed sideways and has a front portion protruding upward and an upper opening covered with a lid 15. A battery charger to change power supplied from a commercial power supply to direct power for charging the batteries contained in the battery box 9 is contained in the battery charger box 14. A charging circuit 16 is formed on one surface of the lid 15.

As shown in FIG. 2, a suction duct 17 extended within the rear cover 3r has one end connected to the cooling air inlet of the power unit 10 and the other end opening into the space within the rear cover 3r.

Figure 3:
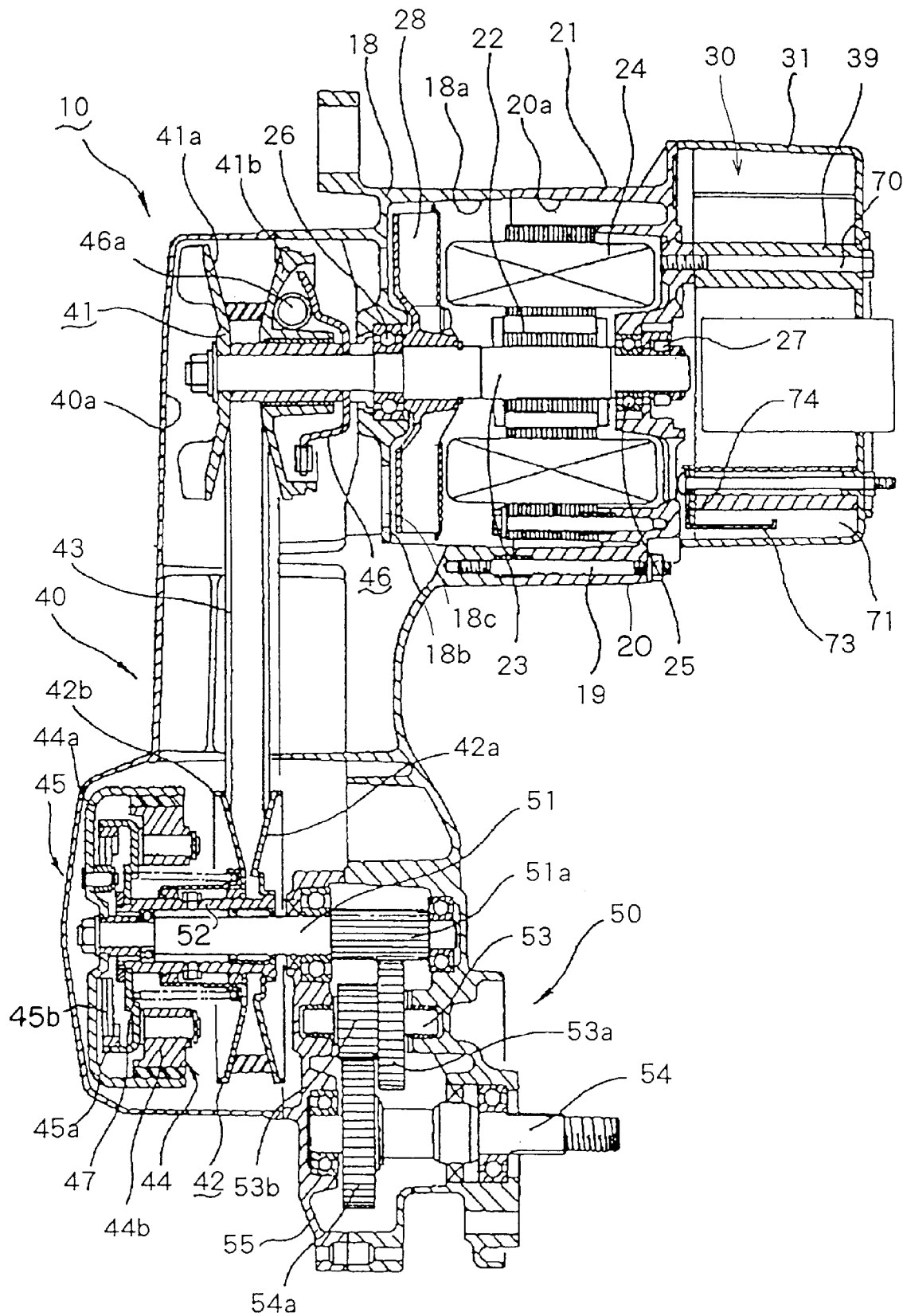
FIG. 3 is a sectional view of a power unit of the electric motorcycle of FIG. 2.

FIG. 3 is a sectional view of the power unit 10 of the electric motorcycle taken on line 3—3 in FIG. 2. The power unit 10 comprises a motor 20, a motor driving circuit 30, a continuously variable speed transmission 40, a reduction gear 50, and a case 18 containing the assembly of the motor 20, the motor driving circuit 30, the continuously variable speed transmission 40 and the reduction gear 50. The case 18 is formed of an aluminum alloy or the like by casting.

A cavity 18a for receiving a portion of the motor 20 is formed in the right-hand front portion of the case 18. A substantially cylindrical motor case 21 is fastened to the cavity 18a with a plurality of bolts 19 to form a motor chamber 20a and the three-phase brushless motor 20 is housed within the motor chamber 20a.

The motor 20 comprises a rotor shaft 23, a rotor 22 provided with magnets and fixedly mounted on the rotor shaft 23, and three stator coils 24. The rotor shaft 23 is supported for rotation on bearings 25 and 26. The left end of the rotor shaft 23, as viewed in FIG. 3, is connected to the continuously variable speed transmission 40. A motor speed sensor 27 for detecting the rotating speed and phase of the rotor shaft 23 is disposed near the right end of the rotor shaft 23. The motor speed sensor 27 is provided with a plurality of magnetic induction devices, such as MR (Magnetic Reactance) devices, capable of detecting a magnetic field created by a magnet fixed to the right end of the rotor shaft 23 at a specified position.

A cooling fan 28 is mounted on the rotor shaft 23 to draw cooling air through the suction duct 17, FIG. 2, and the motor driving circuit 30 into the motor chamber 20a and to blow cooling air through a plurality of openings 18c formed in a partition wall 18b separating the motor chamber 20a and a transmission chamber 40a into the transmission chamber 40a.

The continuously variable speed transmission 40 has a driving pulley 41, a driven pulley 42 and an endless belt 43 extended between the driving pulley 41 and the driven pulley 42. The driving pulley 41 is mounted on the rotor shaft 23 of the motor 20. The driven pulley 42 is mounted on a sleeve 52 mounted for rotation on the input shaft 51 of the reduction gear 50. The driven pulley 42 is coupled with the input shaft 51 through a first centrifugal clutch 44 and a second centrifugal clutch 45, which are arranged in parallel.

The driving pulley 41 consists of a fixed disk 41a fixed to the rotor shaft 23 and a movable disk 41b mounted for axial movement on the rotor shaft 23. The axial movement of the movable disk 41b on the rotor shaft 23 is regulated by a governor 46 provided with weights according to the rotating speed of the rotor shaft 23, so that the working diameter of the driving pulley 41 varies.

The driven pulley 42 consists of a fixed disk 42a fixed to the sleeve 52 and a movable disk 42b mounted for axial movement on the sleeve 52. The movable disk 42b of the driven pulley 42 is biased toward the fixed disk 42a by compression springs 47, the outer clutch plate 45a of the second centrifugal clutch 45 and the movable disk 42b. The working diameter of the driven pulley 42 varies according to the axial movement of the movable disk 42b. The outer clutch plate 45a of the second centrifugal clutch 45 is fixed to the sleeve 52 and the inner clutch plate 45b of the second centrifugal clutch 45 is mounted on the outer clutch plate 44a of the first centrifugal plate 44.

The condition of the second centrifugal clutch 45 is dependent on the rotating speed of the outer clutch plate 44a of the first centrifugal clutch 44. The outer clutch plate 44a of the first centrifugal plate is fixed to the input shaft 51 and the inner clutch plate 44b of the first centrifugal clutch 44 is mounted on the outer clutch plate 45a of the second centrifugal clutch 45. The working condition of the second centrifugal clutch 45 is dependent on the rotating speed of the outer clutch plate 45a.

The first centrifugal clutch 44 engages when the rotating speed of the rotor shaft 23 of the motor 20 is somewhat lower than a rotating speed at which the motor 20 operates at the maximum efficiency. The second centrifugal clutch 45 engages when the rotor shaft 23 of the motor 20 rotates at a rotating speed slightly lower than the rotating speed at which the first centrifugal clutch 44 engages.

The reduction gear 50 comprises a pinion 51a fixed to the input shaft 51, an intermediate shaft 53, gears 53a and 53b fixedly mounted on the intermediate shaft 53, an output shaft 54, and a gear 54a fixedly mounted on the output shaft 54. The pinion 51a and the gear 53a are engaged and the gears 53b and 54a are engaged. The input shaft 51 is supported for rotation on the case 18 and a bearing member 55. The left portion of the input shaft 51, as viewed in FIG. 3, projects into the transmission chamber 40a and is interlocked with the continuously variable speed transmission 40. The output shaft 54 projects from the right side of the case 18, as viewed in FIG. 3, and is fixed to the rear wheel 6r. The motor driving circuit 30 is contained in a motor driving circuit case 31 attached to the right end of the motor case 21 having the motor chamber 20a, as viewed in FIG. 3.

The circuit configuration of this power feed system will be described hereinafter with reference to FIG. 1.

The power feed system 60 has an electromagnetic relay 32 disposed within the motor driving circuit case 31 containing the motor driving circuit 30. The motor speed sensor 27 provides a detection signal 27a to a controller (ECU) 61. A potentiometer 62 is associated with an accelerator grip 7a mounted on the steering bar 7, to detect the angular position of the accelerator grip 7a, and provides a voltage signal representing the angular position of the accelerator grip 7a as a speed command 62a to the controller (ECU) 61. A traveling speed sensor 63 provides a detection signal 63a to the controller (ECU) 61.

The controller (ECU) sets a desired motor speed, i.e., the rotating speed of the rotor shaft 23 of the motor 20, on the basis of the speed command 62a and the detection signal 63a provided by the speed sensor 63, and produces a power feed command 61a on the basis of the phase detection signal 27a representing the phase of the rotor shaft 23a of the motor 20.

A gate drive circuit 33 produces gate control signals 33a in response to the power feed command 61a and applies the same to the gates of six field-effect transistors Q1 to Q6 forming a three-phase bridge circuit. Each of the field-effect transistors Q1 to Q6 may be substituted by a field-effect transistor circuit having a large capacity, formed by connecting a plurality of field-effect transistors in parallel.

A smoothing capacitor 34 and a discharge resistance RD having a resistance in the range of several hundreds kilohms to several megohms are connected in parallel. Diodes D1 to D6 are connected in parallel respectively to the field-effect transistors Q1 to Q6 to protect the field-effect transistors Q1 to Q6 from inverse surge voltages.

The supply of power to the motor driving circuit 30 is controlled through the control of the pair of contacts 32a of the electromagnetic relay 32. When the pair of contacts 32a is open, the smoothing capacitor 34 is not discharged through a terminal 35.

The battery unit 64 having a plurality of batteries is connected through a fuse circuit 65 to the motor driving circuit 32. The fuse circuit 65 is provided with a first fuse 65a having a large current capacity and a second fuse 65b having a small current capacity. Power is supplied through the first fuse 65a and the second fuse 65b to a stabilized power supply 66.

When a combination switch 67 is closed to apply a fixed voltage to a control terminal 66a, the stabilized power supply 66 performs a voltage stabilizing operation to apply a stabilized supply voltage VC for the control circuit to the controller (ECU) 61 and to apply a relay driving voltage VR to the coil 32b of the electromagnetic relay 32.

A series circuit consisting of a current limiting resistor 36 and a diode 37 is connected in parallel to the pair of contacts 32a of the electromagnetic relay 32 to hold the charge of the smoothing capacitor 34 when the pair of contacts 32a is open so that the flow of a large charging current is prevented when the pair of contacts 32a is closed.

Figure 4:
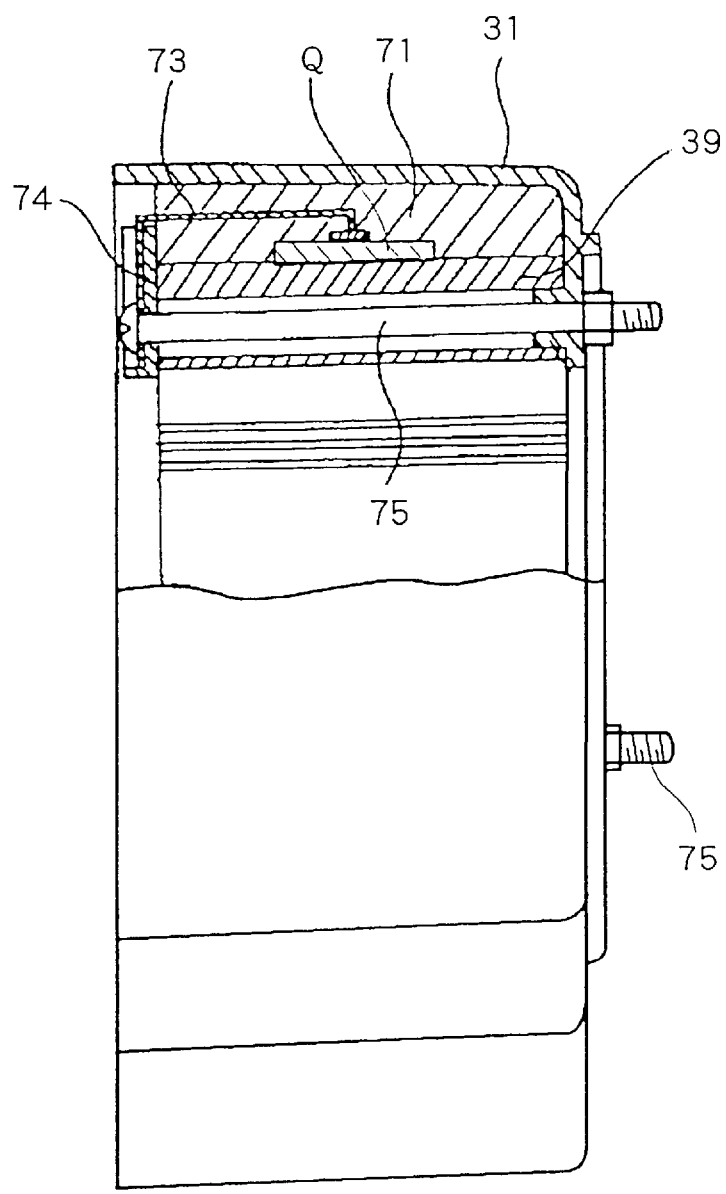
FIG. 4 is a partly cutaway front view of a motor driving circuit as mounted on the electric motorcycle.
Figure 5:
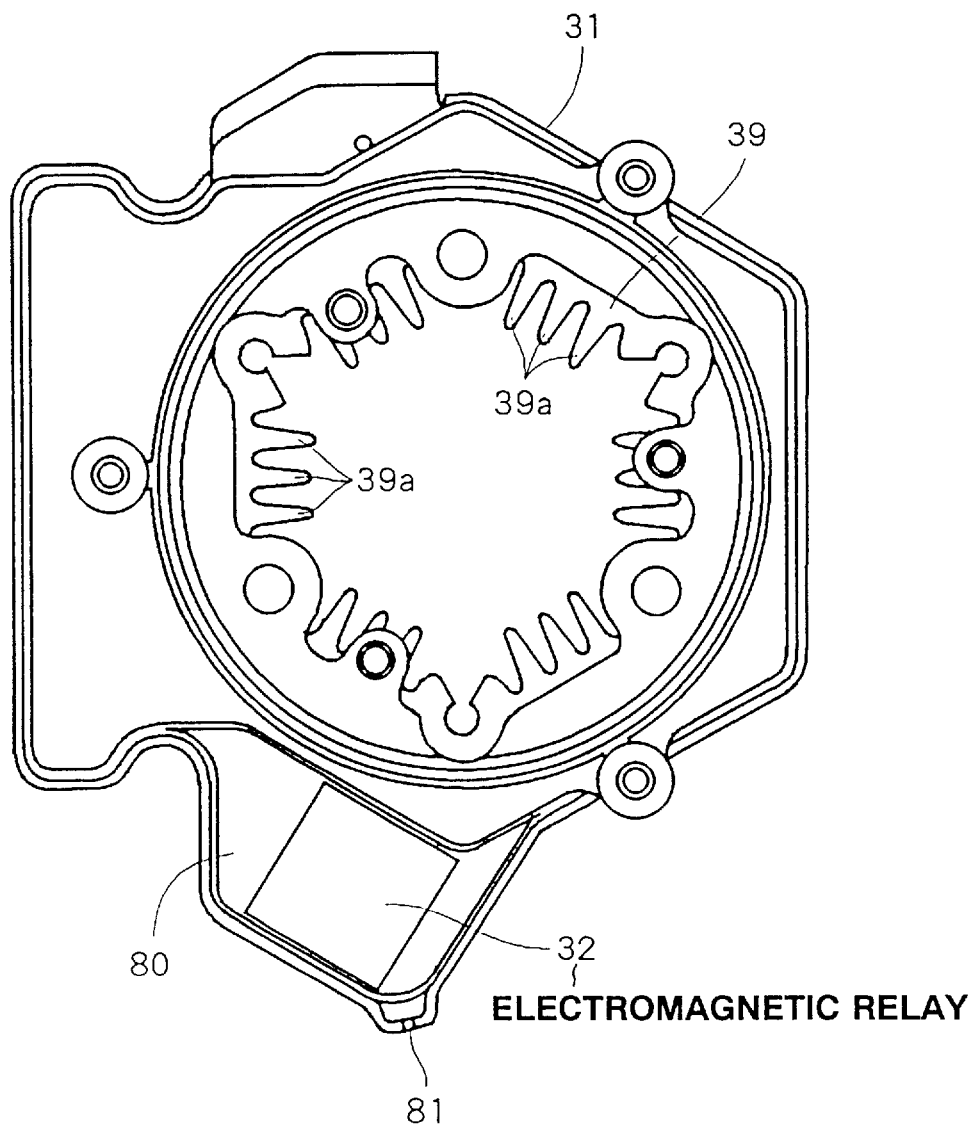
FIG. 5 is a left-hand side view of the motor driving circuit as mounted on the electric motorcycle.
Figure 6:
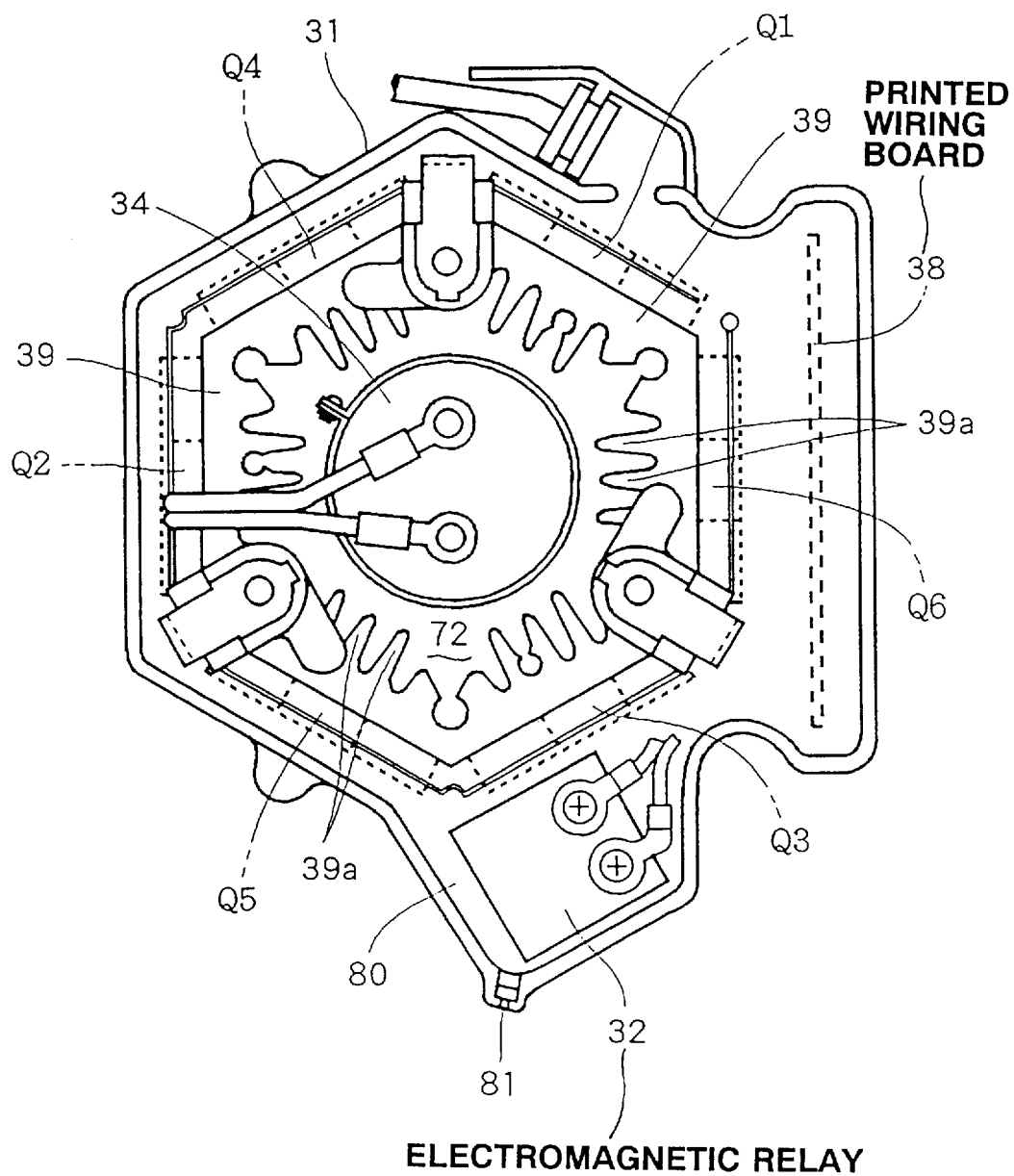
FIG. 6 is a right-hand side view of the motor driving circuit as mounted on the electric motorcycle.
Figure 7:
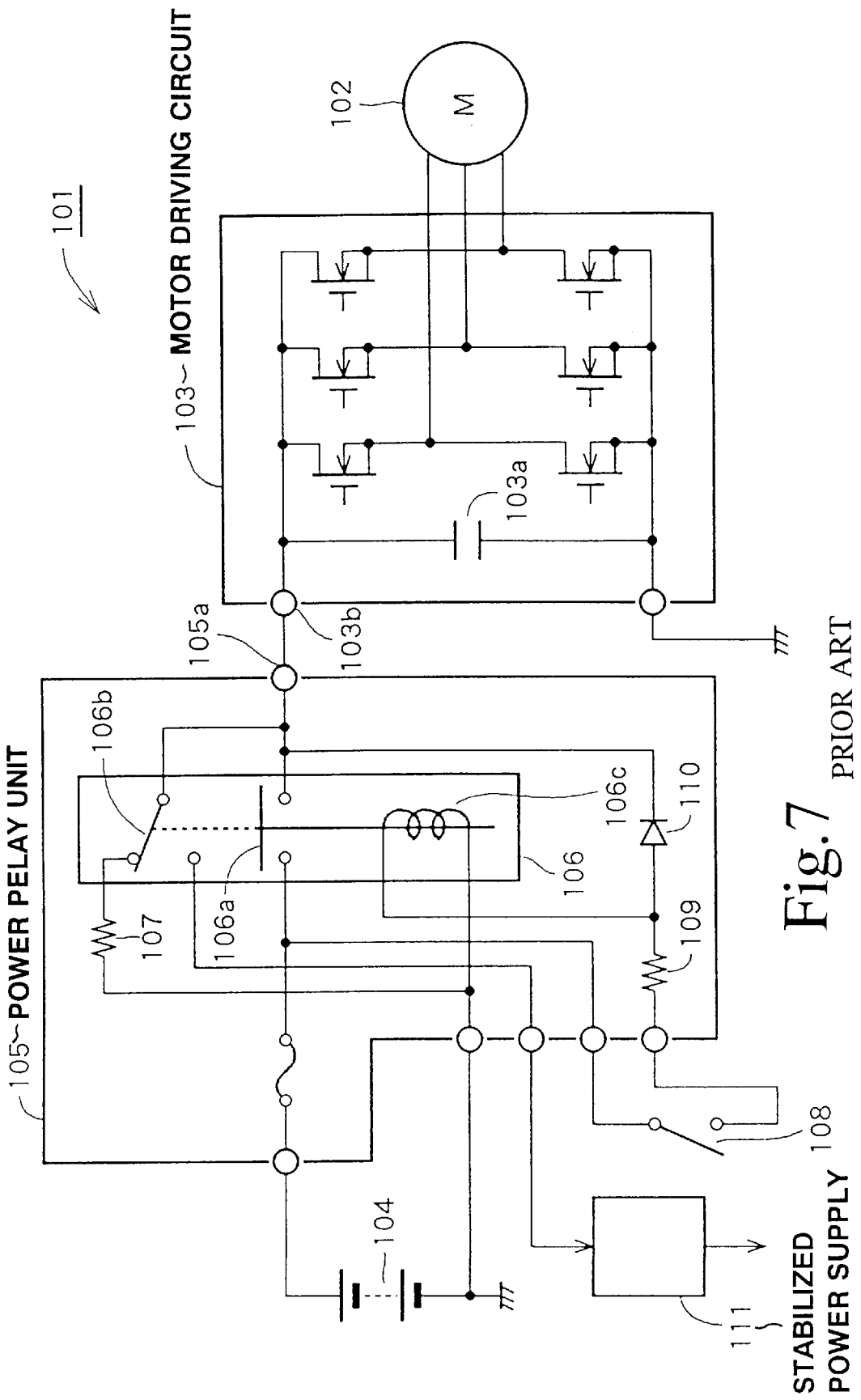
FIG. 7 is a circuit diagram of a conventional power feed system.

FIGS. 4, 5 and 6 are a partly cutaway front view, a left-hand side view and a right-hand side view, respectively, of the motor driving circuit as mounted on the electric motorcycle.

As shown in FIG. 6, a printed wiring board 38 provided with the gate drive circuit 33 is placed in the motor driving circuit case 31, and the field-effect transistors Q1 to Q6 are mounted respectively on the six walls of a heat sink 39 having the shape of a hexagonal cylinder. In this embodiment, each of the field-effect transistors Q1 to Q6 consist of three field-effect transistors connected in parallel.

The heat sink 39 is formed of an aluminum alloy and provided with a plurality of cooling fins 39a on its inner surface. As shown in FIG. 3, the heat sink 39 is fastened to the motor case 21 with three bolts 70 inserted axially through the heat sink 39.

As shown in FIG. 4, the heat sink 39 is covered with the motor driving circuit case 31 formed of an insulating material, such as a resin, and the gap between the outer surface of the heat sink 39 and the motor driving circuit case 31 is filled with an insulating filler 71, such as an epoxy resin. An air inlet opening, now shown, is formed in the side wall of the motor driving circuit case 31 to draw cooling air through the air inlet opening by the cooling fan 28, FIG. 3, so that the cooling air will flow along the cooling fins 39a of the heat sink 39.

As shown in FIG. 6, the substantially cylindrical capacitor 34 is disposed in the central portion of a space defined by the heat sink 39. A cooling air path 72 is formed between the smoothing capacitor 34 and the cooling fins 39a.

As shown in FIG. 4, terminals 73 are connected to the sources and drains of the field-effect transistors Q1 to Q6. The extremity of each of the three terminals 73 on the side of the motor, i.e., to the left as viewed in FIG. 4, is insulated by an insulating material and fastened to the end surface of the heat sink 39 with a bolt 75.

As shown in FIGS. 5 and 6, the motor driving circuit case 31 has a relay mount 80 on which the electromagnetic relay 32 is mounted at its lower end. An opening 81 is formed in the lower end of the relay mount 80 to make the interior of the relay mount 80 communicate with the outside and to enable draining.

Since the electromagnetic relay 32 is placed within the motor driving circuit case 31 containing the motor driving circuit 30, and the pair of contacts 32a of the electromagnetic relay 32 is controlled to supply power to and to interrupt the supply of power to the motor driving circuit 30, the power feed system utilizes a cable for supplying a main current to the motor driving circuit 30 which is shorter than the cable of the conventional power feed system in which the electromagnetic relay 32 is disposed, for example, near the controller (ECU) 61.

Since the smoothing capacitor 34 is disconnected from the power feed side when the pair of contacts 32a of the electromagnetic relay 32 is open, the smoothing capacitor 34 is not discharged.

As is apparent from the foregoing description, since the power feed system for feeding power to an electric vehicle, in accordance with the above-described embodiment of the present invention, has the electromagnetic relay placed within the case containing the motor driving circuit and the electromagnetic relay is controlled to feed power to and to interrupt the feed of power to the motor driving circuit, the main current supply path of the power feed system is shorter than that of the conventional power feed system in which the electromagnetic relay is disposed, for example, near the controller and, consequently, unnecessary power loss can be prevented.

Since the smoothing capacitor is disconnected perfectly from the power feed side when the pair of contacts of the electromagnetic relay is open, the smoothing capacitor is never discharged.

Moreover, since the electromagnetic relay is placed in the lower end of the case containing the motor driving circuit and an opening is formed in the lower end of the case, the space in which the electromagnetic relay is housed can be ventilated and the case can be drained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A power feed system for feeding power to a motor of an electric vehicle, the power feed system comprising:
   a battery supplying high-voltage dc power;
   a fuse circuit;
   a first high-voltage cable connecting said battery and said fuse circuit;
   a motor driving circuit unitarily mounted within a motor housing for converting do supply power into ac power and for feeding the ac power to the motor, said motor driving circuit including a smoothing capacitor and a plurality of semiconductor switches;
   an electromagnetic relay, disposed within the motor housing containing said motor driving circuit, wherein said electromagnetic relay enables and disables do supply power to said motor driving circuit;
   a power supply generating and supplying a relay drive voltage to enable said electromagnetic relay to supply the dc power from said battery to said plurality of switches via said smoothing capacitor wherein the relay drive voltage is less than a voltage of the DC power supplied by said battery
   a second high-voltage cable connecting said fuse circuit and said electromagnetic relay of said motor driving circuit;
   a third high-voltage cable connecting said fuse circuit and said power supply; and
   a control circuit disposed outside the motor housing and separated from said motor driving circuit wherein said control circuit controls said motor driving circuit.

2. The power feed system of claim 1, wherein said electromagnetic relay is disposed within and near the lower end of said case containing said motor driving circuit, said case being provided with an opening at its lower end for draining and ventilation.

3. A power feed system for feeding power to a motor of an electric vehicle comprising:
   a battery for supplying high-voltage dc power;
   a fuse circuit;
   a first high-voltage cable connecting said battery and said fuse circuit;
   motor driving means unitarily mounted within a motor housing, for converting the dc power into ac power and for supplying the ac power to the motor, said motor driving means including a plurality of switches for converting the dc power to ac power; relay means, coupled between said plurality of switches and said fuse circuit, for selectively enabling and disabling supply of the dc power to said plurality of switches; and smoothing means, coupled between said relay means and said plurality of switches, for protecting said plurality of switches from a surge voltage when said relay means enables the supply of dc power from said battery to said plurality of switches; and
   power supply means for generating and supplying a relay drive voltage to enable said relay means to supply the dc power from said battery to said plurality of switches via said smoothing means wherein the relay drive voltage is less than a voltage of the DC power supplied by said battery;
   a second high-voltage cable connecting said fuse circuit and said relay means of said motor driving means;
   a third high-voltage cable connecting said fuse circuit and said power supply means;
   a control circuit disposed outside the motor housing and separated from said motor driving means wherein said control means controls said motor driving means.

4. The power feed system of claim 3, wherein said motor driving means further comprises:
   current limiting means, coupled in parallel with said relay means, for preventing flow of a large charging current from said battery to said plurality of switches via said smoothing means.

5. The power feed system of claim 4, wherein said current limiting means comprises a series coupled configuration of a current limiting resistor and a diode.

6. The power feed system of claim 3, further comprising:
   control means, coupled to said motor driving means, for generating a power feed command signal to set a rotating speed of the motor on the basis of a received speed command signal and a received traveling speed signal,
   said motor driving means further comprising gate drive means, coupled to said plurality of switches, for generating gate control signals which control conversion of the dc power to ac power in accordance with the power feed command signal.

7. The power feed system of claim 6, further comprising:
accelerator means, coupled to said control means, for generating the speed command signal upon manual operation thereof; and
speed sensor means, coupled to said control means, for detecting a traveling speed of the electric vehicle and for generating the traveling speed signal indicative thereof.

8. The power feed system of claim 3, wherein said relay means is mounted within a lower portion of said motor housing relative to the electric vehicle and comprises drain means for draining and ventilating an interior of said motor housing.

9. The power feed system of claim 3, wherein said smoothing means comprises a capacitor coupled in parallel with a discharge resistor.

10. An electric motorcycle comprising:
a battery for supplying dc power;
a fuse circuit;
a first high-voltage cable connecting said battery and said fuse circuit;
a motor for driving the electric motorcycle;
motor driving means unitarily mounted within a motor hosing, for converting the dc power into ac power and for supplying the ac power to the motor, said motor driving means including a plurality of switches for converting the dc power to ac power; relay means, coupled between said plurality of switches and said fuse circuit, for selectively enabling and disabling supply of the dc power to said plurality of switches; and smoothing means, coupled between said relay means and said plurality of switches, for protecting said plurality of switches from a surge voltage when said relay means enables the supply of dc power from said battery to said plurality of switches; and
power supply means for generating and supplying a relay drive voltage to enable said relay means to supply the dc power from said battery to said plurality of switches via said smoothing means wherein the relay drive voltage is less than a voltage of the DC power supplied by said battery;
a second high-voltage cable connecting said fuse circuit and said relay means of said motor driving means;
a third high-voltage cable connecting said fuse circuit and said power supply means; and
a control circuit disposed outside the motor housing and separated from said motor driving means wherein said control means controls said motor driving means.

11. The electric motorcycle of claim 10, wherein said motor driving means further comprises:
current limiting means, coupled in parallel with said relay means, for preventing flow of a large charging current from said battery to said plurality of switches via said smoothing means.

12. The electric motorcycle of claim 11, wherein said current limiting means comprises a series coupled configuration of a current limiting resistor and a diode.

13. The electric motorcycle of claim 10, further comprising:
control means, coupled to said motor driving means, for generating a power feed command signal to set a rotating speed of said motor on the basis of a received speed command signal and a received traveling speed signal,
said motor driving means further including gate drive means, coupled to said plurality of switches, for generating gate control signals which control conversion of the dc power to ac power in accordance with the power feed command signal.

14. The electric motorcycle of claim 13, further comprising:
accelerator means, coupled to said control means, for generating the speed command signal upon manual operation thereof; and
speed sensor means, coupled to said control means, for detecting a traveling speed of the electric motorcycle and for generating the traveling speed signal indicative thereof.

15. The electric motorcycle of claim 10, wherein said relay means is mounted within a lower portion of said motor housing relative to the electric motorcycle and comprises drain means for draining and ventilating an interior of said motor housing.

16. The electric motorcycle of claim 10, wherein said smoothing means comprises a capacitor coupled in parallel with a discharge resistor.

17. A power feed system for feeding power to a motor of an electric vehicle comprising:
a dc power supply;
a fuse circuit;
a first high-voltage cable connecting said dc power supply and said fuse circuit;
motor driving circuit converting the dc power into ac power and supplying the ac power to the motor;
said motor driving circuit including a plurality of switches for converting the dc power to ac power; a relay, coupled between said plurality of switches and said fuse circuit, for selectively enabling and disabling supply of the dc power to said plurality of switches; and a smoothing circuit including a smoothing capacitor, coupled between said relay and said plurality of switches, for protecting said plurality of switches from a surge voltage when said relay enables the supply of dc power from said dc power supply to said plurality of switches; and
a power supply generating and supplying a relay drive voltage to enable said relay to supply the dc power from said dc power supply to said plurality of switches via said smoothing circuit, wherein the relay drive voltage is less than a voltage of the dc power supplied by said dc power supply;
a second high-voltage cable connecting said fuse circuit and said relay of said motor driving circuit;
a third high-voltage cable connecting said fuse circuit and said power supply; and
a control circuit disposed outside the motor housing and separated from said motor driving circuit wherein said control circuit controls said motor driving circuit.

18. The power feed system of claim 17, wherein said motor driving circuit further comprises:
a current limiter, coupled in parallel with said relay, for holding a charge on the smoothing capacitor when said relay is open so as to prevent a flow of a large charging current from said dc power supply to said smoothing circuit when said relay is closed.

19. The power feed system of claim 18, wherein said current limiter comprises a series coupled configuration of a current limiting resistor and a diode.

20. The power feed system of claim 17, further comprising:

a control circuit, coupled to said motor driving circuit, generating a power feed command signal to set a rotating speed of the motor on the basis of a received speed command signal and a received traveling speed signal, said motor driving circuit further comprising a gate driver, coupled to said plurality of switches, for generating gate control signals which control conversion of the dc power to ac power in accordance with the power feed command signal.

21. The power feed system of claim 20, further comprising:

accelerator means, coupled to said control circuit, for generating the speed command signal upon manual operation thereof; and speed sensor means, coupled to said control means, for detecting a traveling speed of the electric vehicle and for generating the traveling speed signal indicative thereof.

22. The power feed system of claim 17, further comprising a motor housing wherein said relay is mounted within a lower portion of said motor housing relative to the electric vehicle and wherein said motor housing includes a drain means for draining and ventilating an interior of said motor housing.

23. The power feed system of claim 17, wherein said smoothing circuit comprises a capacitor coupled in parallel with a discharge resistor.

* * * * *